June 28, 1955  F. P. BENTZ  2,711,866
QUICK RELEASE FOR AIRPLANE MOTORS
Filed Sept. 15, 1952  3 Sheets-Sheet 1

Floyd P. Bentz
INVENTOR.

June 28, 1955   F. P. BENTZ   2,711,866
QUICK RELEASE FOR AIRPLANE MOTORS
Filed Sept. 15, 1952   3 Sheets-Sheet 2

Floyd P. Bentz
INVENTOR.

June 28, 1955 F. P. BENTZ 2,711,866
QUICK RELEASE FOR AIRPLANE MOTORS
Filed Sept. 15, 1952 3 Sheets-Sheet 3

Floyd P. Bentz
INVENTOR.

United States Patent Office 2,711,866
Patented June 28, 1955

2,711,866

QUICK RELEASE FOR AIRPLANE MOTORS

Floyd P. Bentz, Gillette, Wyo., assignor of twenty-five per cent to William D. Hewit, Englewood, Colo.

Application September 15, 1952, Serial No. 309,681

6 Claims. (Cl. 244—54)

This invention relates to new and useful improvements in motor mounts for airplanes and the primary object of the present invention is to provide a quick release for airplane motors, whereby an inactive motor may be released from its plane so that the plane may land in a relatively safe manner.

Another important object of the present invention is to provide a quick release between the body frame and motor supporting frame of an airplane that involves a dash panel mounted switch which is manually actuated to activate the release, whereupon the motor will be removed from the plane.

A further object of the present invention is to provide a quick release for airplane motors including locking elements which may be individually manually retracted to their unlocking position whereby a motor may be removed from its plane in a convenient manner while the plane is on the ground, and involving a hydraulic actuator operatively connected to the locking elements so that the same may be simultaneously retracted when removal of a motor is desired while the plane is in the air.

A still further aim of the present invention is to provide a quick release for airplane motors that is extremely simple and practical in construction, strong and reliable in use, small and compact in structure, efficient and durable in operation, inexpensive to manufacture, install and service, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, in which:

Figure 1:
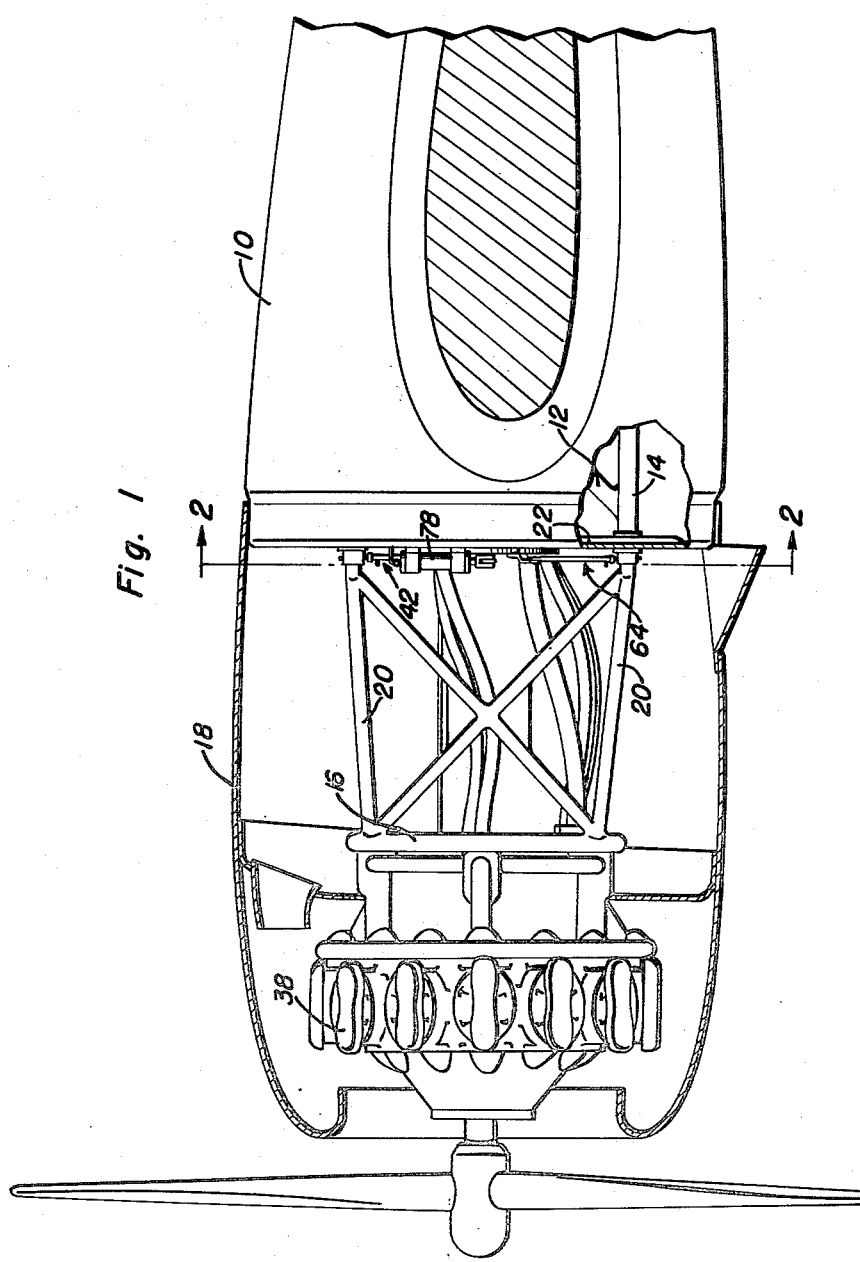
Figure 1 is a fragmentary view of an airplane partly in section and partly in elevation and showing the invention in use.
Figure 2:
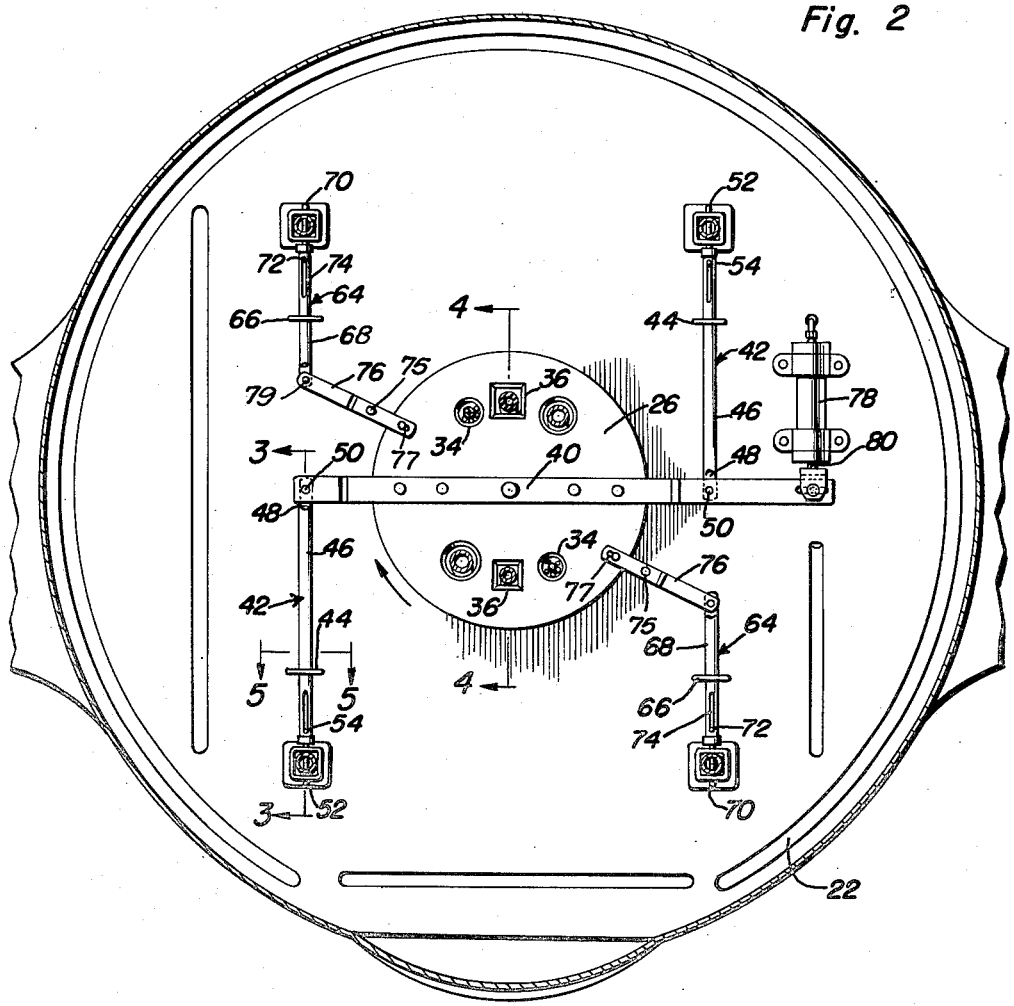
Figure 2 is an enlarged vertical sectional view taken substantially on the plane of section line 2—2 of Figure 1.
Figure 6:
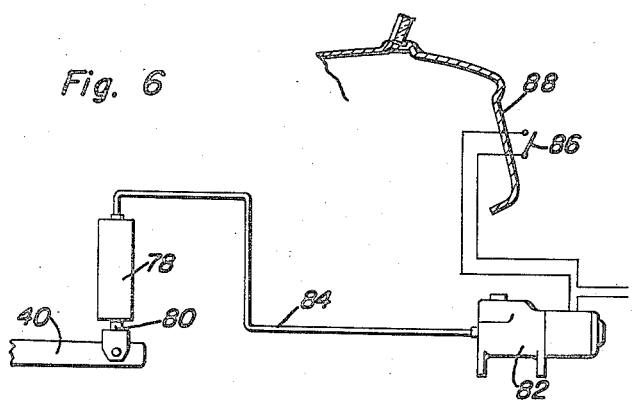
Figure 6 is a diagrammatic view showing the remote actuator for the quick release.

Referring now to the drawings in detail, wherein for the purpose of illustration, there is disclosed a preferred embodiment of the present invention, the numeral 10 represents an airplane having the usual body frame 12 including longitudinally extending tubular members 14. A motor supporting frame 16 is disposed in the nose 18 of the airplane and includes longitudinally extending tubular members 20 whose rear ends are telescoped within the forward ends of tubular members 14.

Figure 3:
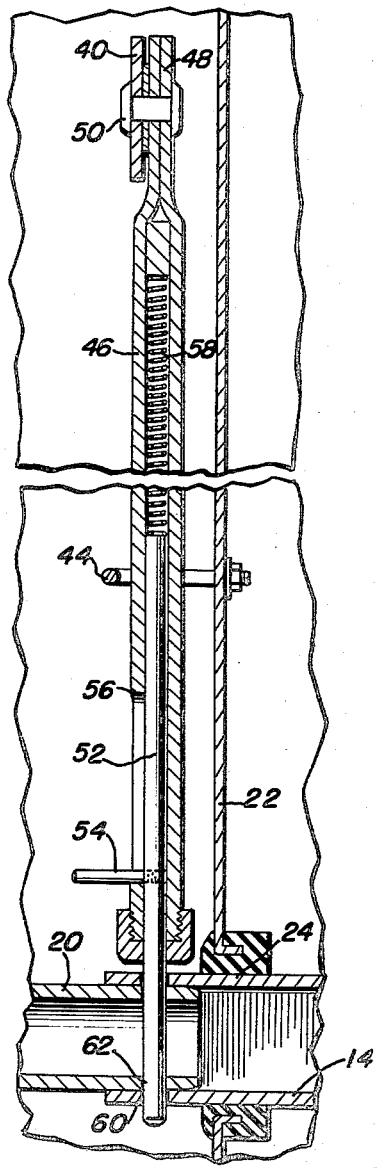
Figure 3 is an enlarged vertical sectional view taken substantially on the plane of section line 3—3 of Figure 2.
Figure 4:
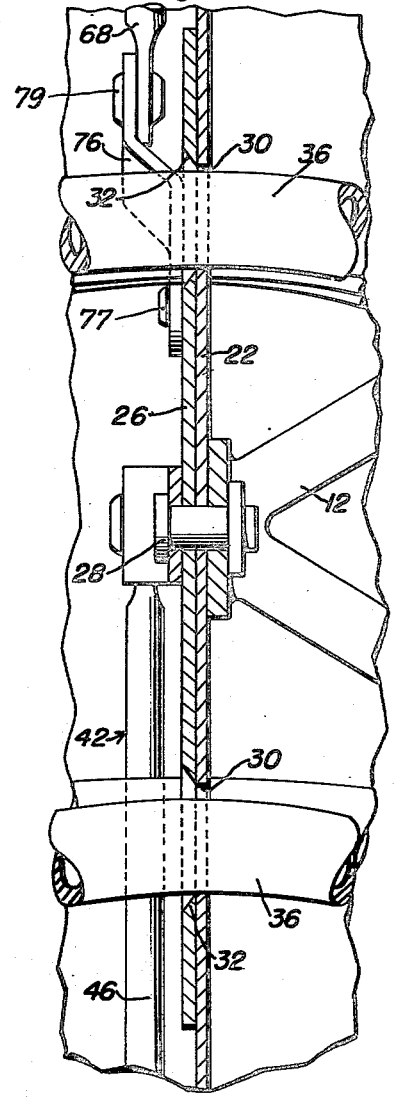
Figure 4 is an enlarged vertical sectional view taken substantially on the plane of section line 4—4 of Figure 2.
Figure 5:
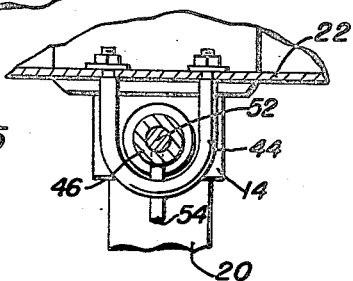
Figure 5 is an enlarged horizontal sectional view taken substantially on the plane of section line 5—5 of Figure 2.

A fire wall or base 22 is suitably fixed in the airplane and is provided with reinforced openings 24 that receive the forward ends of the tubular members 14 as shown in Figure 3 of the drawings. A rotatable member or plate 26 is disposed in front of the base 22. Plate 26 and base 22 are centrally apertured to receive a pivot 28 that is secured to frame 12 and upon which plate 26 may rotate.

Base 22 and plate 26 are formed with registering apertures or openings 30 and 32. The edges of the apertures 32 are beveled or sharpened to form cutting edges that will cut the cables 34 and conduits 36 that extend through these apertures and to the motor 38 mounted on frame 16 when the plate 26 is rotated relative to the base 22.

A bar 40 extends diametrically across the front face of plate 26 and is secured to the plate 26, by suitable means, so that it will rotate with the plate 26. The end portions of bar 40 are pivotally attached to a pair of relatively oppositely extending spaced parallel locking elements 42 that are slidably received by U-shaped bolts 44 which are attached to the base 22.

The locking elements 42 each include a tube 46 having a flattened inner end 48 pivoted as at 50 to the bar 40. A rod 52 is slidably received in the outer end of each tube 46 and removably supports a laterally projecting pin 54 that is slidable in a slot 56 in each tube 46. A coil spring 58 within the inner end portion of each tube 46 engages the rod 52 of its associated locking element to urge the rod 52 outwardly from the outer end of its guide and supporting tube and through registering apertures 60 and 62 in the telescoped ends of the tubular members 14 and 20, as shown in Figure 3.

A second pair of locking elements 64 are slidably received by U-bolts 66 attached to the base 22. The locking elements 64 are similar in construction to the locking elements 42 and include tubes 68 whose outer end portions slidably receive rods 70 that are urged outwardly from the outer ends of the tube 68 by coil springs (not shown) within the tubes 68. Finger gripping pins 72 are removably secured to and project laterally from the rods 70. The pins 72 are received in longitudinal slots 74 in tubes 68. Rods 70 extend through registering apertures in the telescoped ends of tubular members 14 and 20.

Vertically swingable links 76 are pivoted at their centers to the base 22 by pivot pins 75. The outer ends of the links 76 are pivoted to the flattened inner ends of the tubes 68 by pivot pins 79 and the inner ends of the links 76 are pivotally and slidably secured to plate 26 by pins 77.

Means is provided for rotating the plate 26 so that the locking elements 42 and 44 will simultaneously release the frame members 14 and 20, thereby releasing the motor and its frame 20 from the plane 10. This means comprises a fluid actuated cylinder 78 suitably mounted on base 22 and having a piston rod 80 that is slidably pivotally attached to one end of bar 40. A solenoid actuated pump 82 is connected to the cylinder 78 by a conduit 84 and a switch 86 for the pump 82 is mounted on the instrument panel 88 of the airplane 10 so that as the pilot closes switch 86 fluid under pressure will enter cylinder 78 to extend rod 80 and rotate plate 26.

As the plate 26 is rotated by the cylinder 78, the rods 52 and 70 of the locking elements 42 and 64 will be retracted and the lines extending through apertures 30 and 32 will be cut so that the motor will be released and it will drop from the plane.

The rods 52 and 70 may be individually retracted by the pins 54 without rotation of plate 26 so that the motor may be removed from the plane for servicing when the plane is on the ground. In this instance, the connections to the motor that extend through apertures 30 and 32 are removed before the rods 52 and 70 are retracted.

Obviously, the number of locking elements 42, 64 employed may be increased or decreased depending upon the type of airplane on which the quick release is used.

Having described the invention, what is claimed as new is:

1. In an airplane including a body frame composed of tubular members having forward ends and a motor supporting frame having tubular members with rear ends telescoped within the forward ends of first named tubular members, means releasably securing the tubular members of the motor supporting frame within the tubular members of the body frame, said means comprising a rotatable plate, means operatively connected to said rotatable plate for rotating the same, and locking elements extending through the telescoped tubular members and attached to the rotatable plate to be retracted as the rotatable plate is rotated in one direction, a fire wall supporting said rotatable plate and having openings receiving the forward ends of said body frame tubular members, and means forming part of said rotatable plate for cutting lines to an airplane motor on said motor supporting frame.

2. In an airplane including a body frame composed of tubular members having forward ends and a motor supporting frame having tubular members with rear ends telescoped within the forward ends of first named tubular members, means reelasably securing the tubular members of the motor supporting frame within the tubular members of the body frame, said means comprising a rotatable member, means operatively connected to said rotatable member for rotating the same, and locking elements extending through the telescoped tubular members and attached to the rotatable member to be retracted as the rotatable member is rotated in one direction, a fire wall supporting said rotatable member and having openings receiving the forward ends of said body frame tubular members, and means forming part of said rotatable member for cutting lines to an airplane motor on said motor supporting frame, said cutting means including a plurality of apertures in said rotatable member, said apertures having beveled cutting edges.

3. In an airplane including a body frame composed of tubular members having forward ends and a motor supporting frame having tubular members with rear ends telescoped within the forward ends of first named tubular members, means releasably securing the tubular members of the motor supporting frame within the tubular members of the body frame, said means comprising a rotatable member, means operatively connected to said rotatable member for rotating the same, and locking elements extending through the telescoped tubular members and attached to the rotatable member to be retracted as the rotatable member is rotated in one direction, said locking elements each comprising an outer tube, an inner tube slidably received in the outer tube, a spring disposed in the outer tube biasing the inner and outer tubes apart and a finger grip fixed to the inner tube and permitting the inner tube to be moved into the outer tube so that the inner tube may be manually retracted from the telescoped tubular members.

4. A quick release for airplane motors, said quick release comprising a base, a plate rotatably supported on said base, a bar secured diametrically across the plate, at least four locking elements slidably carried by said base and movable into and out of locking position, two of said locking elements being pivoted to said bar, a pair of links centrally pivotally attached to the base, said links being terminally pivoted to the plate and the other two locking elements, and means connected to the bar for rotating the plate to simultaneously move the locking elements into their unlocking position.

5. A quick release for airplane motors, said quick release comprising a base, a plate rotatably supported on said base, a bar secured diametrically across the plate, at least four locking elements slidably carried by said base and movable into and out of locking position, two of said locking elements being pivoted to said bar, a pair of links centrally pivotally attached to the base, said links being terminally pivoted to the plate and the other two locking elements, and means connected to the bar for rotating the plate to simultaneously move the locking elements into their unlocking position, said base and said plate having openings therein adapted to receive lines and cables extending to a motor supported in front of the base, the edges of the openings in said plate being sharpened and adapted to cut the cables and lines as the plate is rotated.

6. A quick release for airplane motors, said quick release comprising a base, a plate rotatably supported on said base, a plurality of locking elements attached to said plate and slidably supported by said base, and means connected to said plate for rotating said plate to move the locking elements to an unlocking position, each of said locking elements including inner and outer slidably interconnected tubes, a spring disposed in the outer tube biasing the tubes apart and a pin attached to the inner tube and slidably carried by the outer tube for retracting the inner tube.

References Cited in the file of this patent

UNITED STATES PATENTS

| | | |
|---|---|---|
| 1,237,889 | Fernandez | Aug. 21, 1917 |
| 1,280,627 | Anderson | Oct. 8, 1918 |
| 1,879,632 | O'Brien | Sept. 27, 1932 |
| 2,001,158 | Sears et al. | May 14, 1935 |
| 2,237,528 | Marasso | Apr. 8, 1941 |
| 2,589,539 | Childress | Mar. 18, 1952 |

OTHER REFERENCES

Page 26 of Automotive and Aviation Industries, May 1, 1944.